United States Patent
Zhu et al.

(10) Patent No.: US 12,548,769 B2
(45) Date of Patent: Feb. 10, 2026

(54) POSITIVE ELECTRODE ACTIVE MATERIAL AND PREPARATION METHOD THEREFOR, SODIUM ION BATTERY, AND APPARATUS COMPRISING SODIUM ION BATTERY

(71) Applicant: CONTEMPORARY AMPEREX TECHNOLOGY (HONG KONG) LIMITED, Hong Kong (CN)

(72) Inventors: Jinyou Zhu, Ningde (CN); Yongsheng Guo, Ningde (CN); Chengdu Liang, Ningde (CN); Qian Liu, Ningde (CN); Wenguang Lin, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 793 days.

(21) Appl. No.: 17/400,130

(22) Filed: Aug. 12, 2021

(65) Prior Publication Data
US 2022/0037660 A1    Feb. 3, 2022

Related U.S. Application Data

(63) Continuation of application No. PCT/CN2020/072452, filed on Jan. 16, 2020.

(30) Foreign Application Priority Data

Feb. 12, 2019 (CN) .......................... 201910111957.6

(51) Int. Cl.
*H01M 4/525* (2010.01)
*C01G 49/00* (2006.01)
(Continued)

(52) U.S. Cl.
CPC ........ *H01M 4/525* (2013.01); *C01G 49/0072* (2013.01); *C01G 53/50* (2013.01);
(Continued)

(58) Field of Classification Search
CPC ............... H01M 4/525; H01M 10/054; H01M 2004/021; H01M 2004/028;
(Continued)

(56) References Cited

U.S. PATENT DOCUMENTS

| 8,835,041 B2 | 9/2014 | Johnson et al. |
| 9,126,844 B2 | 9/2015 | Johnson et al. |

(Continued)

FOREIGN PATENT DOCUMENTS

| CN | 101636860 B | 9/2012 |
| CN | 102683672 A † | 9/2012 |

(Continued)

OTHER PUBLICATIONS

PCT International Search Report for PCT/CN2020/072452, dated Apr. 16, 2020, 9 pages.
The First Office Action for China Application No. 201910111957.6, dated Jan. 7, 2021, 9 pages.
The Second Office Action for China Application No. 201910111957.6, dated May 14, 2021, 10 pages.
The Rejection Decision for China Application No. 201910111957.6, dated Sep. 24, 2021, 6 pages.
(Continued)

*Primary Examiner* — Adam A Arciero
(74) *Attorney, Agent, or Firm* — East IP P.C.

(57) ABSTRACT

The present application discloses a positive electrode active material satisfying the chemical formula $L_xNa_yM_zCu_\alpha Fe_\beta Mn_\gamma O_{2+\delta-0.5\eta}X_\eta$ and a preparation method therefor, a sodium ion battery and an apparatus including such battery, wherein L is a doping element at alkali metal site, M is a doping element at transition metal site, and X is a doping element at oxygen site, $0 \leq x < 0.35$, $0.65 \leq y \leq 1$, $0 < \alpha \leq 0.3$, $0 < \beta \leq 0.5$, $0 < \gamma \leq 0.5$, $-0.03 \leq \delta \leq 0.03$, $0 \leq \eta \leq 0.1$, $z+\alpha+\beta+\gamma=1$, $mx+y+nz+2\alpha+3\beta+4\gamma=2(2+\delta)$, m is the valence state of L, and n is the valence state of M; and the pH of the positive electrode active material is 10.5-13, wherein L is a doping element at alkali metal site, M is a doping element (Continued)

at transition metal site, and X is a doping element at oxygen site.

18 Claims, 2 Drawing Sheets

(51) Int. Cl.
    *C01G 53/50*         (2025.01)
    *H01M 4/02*         (2006.01)
    *H01M 10/054*       (2010.01)

(52) U.S. Cl.
    CPC ....... H01M 10/054 (2013.01); *C01P 2002/52* (2013.01); *C01P 2002/76* (2013.01); *C01P 2002/78* (2013.01); *C01P 2004/61* (2013.01); *C01P 2006/10* (2013.01); *C01P 2006/11* (2013.01); *C01P 2006/12* (2013.01); *C01P 2006/40* (2013.01); *H01M 2004/021* (2013.01); *H01M 2004/028* (2013.01)

(58) Field of Classification Search
    CPC . C01G 49/0072; C01G 53/50; C01P 2002/52; C01P 2002/76; C01P 2002/78; C01P 2004/61; C01P 2006/10; C01P 2006/12
    See application file for complete search history.

(56) References Cited

U.S. PATENT DOCUMENTS

| | | | |
|---|---|---|---|
| 2016/0293945 A1* | 10/2016 | Hu | ........................ C01G 53/50 |
| 2017/0187039 A1 | 6/2017 | Sun et al. | |

FOREIGN PATENT DOCUMENTS

| | | |
|---|---|---|
| CN | 103904317 A | 7/2014 |
| CN | 104795550 A | 7/2015 |
| CN | 104795552 A | 7/2015 |
| CN | 104795552 B | 8/2016 |
| CN | 105932260 A | 9/2016 |
| CN | 104617288 B | 5/2017 |
| CN | 104795551 B | 7/2017 |
| CN | 107093713 A | 8/2017 |
| CN | 107871864 A | 4/2018 |
| CN | 108475782 A | 8/2018 |
| EP | 3048659 A1 † | 7/2016 |

OTHER PUBLICATIONS

Linqin Mu et al., "Prototype Sodium-Ion Batteries Using An Air-Stable and Co/Ni-Free O3-Layered Metal Oxide Cathode", Advance Materials, vol. 27, dated Dec. 31, 2015, 6 pages.
Shuyin Xu et al., "Suppressing the voltage decay of low-cost P2-type iron-based cathode materials for sodium-ion batteries", Journal of Materials Chemistry A, vol. 6, dated Sep. 24, 2018, 9 pages.
The Third Party Observations for EP Application No. 20755392.6, dated Aug. 3, 2022, 13 pages.
The extended European search report for EP Application No. 20755392.6, dated Feb. 15, 2022, 4 pages.
The First Examination Report for EP Application No. 20755392.6, dated Feb. 25, 2022, 5 pages.
Moeller; Inorganic Chemistry: An Advanced Textbook; p. 502, Published Jan. 1, 1963, Wiley.†
Bucher et al; Layered NaxMnO2+z in Sodium Ion Batteries—Influence of Morphology of Cycle Performance; pp. 8059-8065, Published May 12, 2014; ACS Appl. Mater, Interfaces 6.†
Housecroft et al; Chemistry; p. 656; Published 2006; Third Edition, Pearson Education Limited.†
Barker et al. Commercialization of Faradion's High Energy Density Na-ion Battery Technology; p. 656; Published Dec. 2016; 3rd International Conference on Sodium Batteries.†
You et al; Insights into the Improved High-Voltage Performance of Li-Incorporated Layered Oxide Cathode for Sodium-Ion Batteries; pp. 2124-2139; Published Sep. 13, 2018; Chem 4.†
Supplementary European Search Report issued Feb. 15, 2022 for EP Application No. 20755492.6; published on Nov. 11, 2021.†
Communication pursuant to Article 94(3) issued Feb. 25, 2022 for EP Application No. 20755392.6 published by the EPO on Nov. 11, 2021.†
Mu et al.; Prototype Sodium-Ion Batteries Using an Air-Stable and Co/Ni-Free O3-Layered Metal Oxide Cathode; pp. 1-11; Published Oct. 5, 2015; Adv. Mater.†

\* cited by examiner
† cited by third party

POSITIVE ELECTRODE ACTIVE MATERIAL AND PREPARATION METHOD THEREFOR, SODIUM ION BATTERY, AND APPARATUS COMPRISING SODIUM ION BATTERY

CROSS-REFERENCES TO RELATED APPLICATIONS

The present application is a continuation of International Application No. PCT/CN2020/072452, filed on Jan. 16, 2020, which claims the priority of Chinese patent application No. 201910111957.6, submitted on Feb. 12, 2019 under the name "Positive Electrode Active Material, Preparation Method Thereof and Sodium Ion Battery", both of which are hereby incorporated by reference in their entireties.

TECHNICAL FIELD

The present application belongs to the technical field of energy storage apparatuses, in particular relates to a positive electrode active material and its preparation method, sodium ion battery and apparatuses containing sodium ion batteries.

BACKGROUND

At present, lithium ion battery occupies the core position of power battery and also faces great challenges, such as the increasing shortage of lithium resources, the rising price of upstream materials, the lag in the development of recycling technology, and the low recycling utilization rate of old batteries. Sodium ion batteries can be charged and discharged by virtue of extraction and insertion of sodium ions between positive and negative electrodes, the reserves of sodium resources are much more abundant than lithium, the sodium resources are more widely distributed and much cheaper than lithium, so sodium ion batteries can be used as an effective supplement to lithium ion batteries in electric vehicles and energy storage fields.

Among others, sodium-base transition metal oxide is considered as one of the most promising positive electrode active materials for commercialization in sodium ion batteries. However, sodium-base transition metal oxides face the problem of poor electrochemical performance during use, which limits their commercialization.

SUMMARY

The first aspect of the application provides a positive electrode active material, which satisfies the chemical formula $L_xNa_yM_zCu_\alpha Fe_\beta Mn_\gamma O_{2+\delta-0.5\eta}X_\eta$, wherein L is a doping element at alkali metal site, and selected from one or more of $Li^+$, $K^+$, $Mg^{2+}$, $Ca^{2+}$ and $Zn^{2+}$; M is a doping element at transition metal site, and selected from one or more of $Li^+$, $Ni^{2+}$, $Mg^{2+}$, $Mn^{2+}$, $Zn^{2+}$, $Ca^{2+}$, $Ca^{2+}$, $Ba^{2+}$, $Sr^{2+}$, $Mn^{3+}$, $Al^{3+}$, $B^{3+}$, $Cr^{3+}$, $V^{3+}$, $Zr^{4+}$, $Ti^{4+}$, $Sn^{4+}$, $V^{4+}$, $Mo^{4+}$, $Mo^{5+}$, $Ru^{4+}$, $Nb^{5+}$, $Si^{4+}$, $Nb^{6+}$, $Mo^{6+}$ and $Te^{6+}$; X is a doping element at oxygen site, and selected from one or more of $F^-$, $Cl^-$, $Br^-$, and $I^-$; $0 \le x < 0.35$, $0.65 \le y \le 1$, $0 < \alpha \le 0.3$, $0 < \beta \le 0.5$, $0 < \gamma \le 0.5$, $-0.03 \le \delta \le 0.03$, $0 \le \eta \le 0.1$, $z+\alpha+\beta+\gamma=1$, and $mx+y+nz+2\alpha+3\beta+4\gamma=2(2+\delta)$, wherein m is the valence state of L, and n is the valence state of M; and the positive electrode active material has a pH value of from 10.5 to 13.

The second aspect of the present application provides a method for preparing the positive electrode active materials, comprising the following steps:

Mixing a L source, Na source, M source, Cu source, Fe source, Mn source and X source in a preset proportion, and then conducting a thermal treatment in an oxygen-containing atmosphere to obtain a sodium transition metal oxide;

Washing the sodium transition metal oxide with a washing solution, wherein the washing solution has a pH value of from 3 to 13, optionally from 6 to 12;

Rewashing the washed sodium transition metal oxide with deionized water; and drying the re-washed sodium transition metal oxide to obtain the positive electrode active material.

The third aspect of the present application provides a sodium ion battery comprising the positive electrode active material according to the first aspect of the present application, and/or the positive electrode active material prepared by using the preparation method according to the second aspect of the present application.

The fourth aspect of the present application provides an apparatus which includes the sodium ion battery according to the third aspect of the present application.

The embodiments according to the present application has at least the following beneficial effects over the prior art:

The positive electrode active material provided by the present application has specific chemical composition, and the pH value of the positive electrode active material is controlled in the range of 10.5~13, which can effectively improve the structural stability of the positive electrode active material upon charging and discharging, and effectively improve the capacity performance and Coulomb efficiency of the positive electrode active material, making the positive electrode active material higher first cycle charge/discharge specific capacity and first cycle Coulomb efficiency. The sodium ion battery in the present application includes the positive electrode active material provided by the present application, and has a higher first cycle charge/discharge specific capacity and a first-cycle Coulomb efficiency. More optionally, the sodium ion batteries also have better cycle performance. The apparatus according to the present application includes the sodium ion battery provided in the present application, and thus have at least the same advantages as the sodium ion battery.

DESCRIPTION OF THE DRAWINGS

In order to explain the technical scheme of the embodiments of the invention more clearly, the appended drawings to be used in the embodiments of the invention are briefly introduced below. Obviously, the appended drawings described below only illustrate some embodiments of the present application. For the person of ordinary skill in the art, other drawings can be obtained based on the appended drawings without creative efforts.

DETAILED DESCRIPTION

Figure 1:
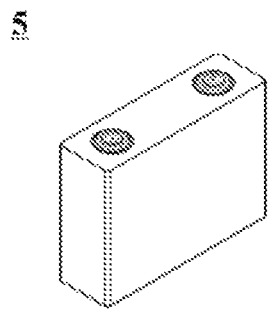
FIG. 1 is a schematic diagram of an embodiment of a sodium ion battery.

In order to make the purpose, technical scheme and beneficial technical effects of the present application more clear, the application will be described in more details in conjunction with some embodiments below. It should be understood that the embodiments described in this specification are intended only for the purpose of interpreting the present application and are not intended to limit it by any means.

For simplicity, this paper only explicitly discloses some numerical ranges. However, any lower limit may form an unspecified range in combination with any upper limit, any lower limit may form an unspecified range in combination with any other lower limit, and any other upper limit may form an unspecified range in combination with any other upper limit. Moreover, although not explicitly documented, each endpoint or individual value between the endpoints in the range is contained within that range. Therefore, each point or single value can be used as its own lower limit or upper limit, combined with any other point or single value, or combined with other lower or upper limits to form an inexplicitly documented range.

In the present specification, it is necessary to state that, unless otherwise stated, the terms "above" and "below" encompass the numerical value associated thereof, and the term "more" in "one or more" means two or more.

The contents in the present application do not intend to describe each embodiment or implementation. Instead, the following description illustrates exemplary embodiments in more details. At several passages throughout the application specification, guidance is provided through a series of embodiments, which can be combined in various manners. In each embodiment, enumerations only cover representative examples and should not be interpreted as exhaustive.

Positive Electrode Active Material

First of all, the positive electrode active material according to the first aspect of the present application is illustrated. The positive electrode active material satisfies the chemical formula $L_xNa_yM_zCu_\alpha Fe_\beta Mn_\gamma O_{2+\delta-0.5\eta}X_\eta$, in which L is a doping element at alkali metal site, and selected from one or more of $Li^+$, $K^+$, $Mg^{2+}$, $Ca^{2+}$ and $Zn^{2+}$; M is a doping element at transition metal site, and selected from one or more of $Li^+$, $Ni^{2+}$, $Mg^{2+}$, $Mn^{2+}$, $Zn^{2+}$, $Ca^{2+}$, $Ca^{2+}$, $Ba^{2+}$, $Sr^{2+}$, $Mn^{3+}$, $Al^{3+}$, $B^{3+}$, $Cr^{3+}$, $V^{3+}$, $Zr^{4+}$, $Ti^{4+}$, $Sn^{4+}$, $V^{4+}$, $Mo^{4+}$, $Mo^{5+}$, $Ru^{4+}$, $Nb^{5+}$, $Si^{4+}$, $Nb^{6+}$, $Mo^{6+}$ and $Te^{6+}$; X is a doping element at oxygen site, and selected from one or more of $F^-$, $Cl^-$, $Br^-$, and $I^-$, optionally $F^-$; $0 \le x < 0.35$, $0.65 \le y \le 1$, $0 < \alpha \le 0.3$, $0 < \beta \le 0.5$, $0 < \gamma \le 0.5$, $-0.03 \le \delta \le 0.03$, $0 \le \eta \le 0.1$, $z+\alpha+\beta+\gamma=1$, and $mx+y+nz+2\alpha+3\beta+4\gamma=2(2+\delta)$, wherein m is the valence state of L, and n is the valence state of M, and the positive electrode active material has a pH of from 10.5 to 13.

The positive electrode active material provided by the present application has specific chemical composition, and the pH value of the positive electrode active material is controlled in the range of 10.5~13, which can effectively improve the structural stability of the positive electrode active material upon charging and discharging, and effectively improve the capacity performance and Coulomb efficiency of the positive electrode active material, making the positive electrode active material higher first cycle charge/discharge specific capacity and first cycle Coulomb efficiency.

The positive electrode active material in the present application has specific chemical composition, and the pH value of the positive electrode active material is controlled within the range of 10.5-13, which makes the positive electrode active material highly stable to moisture and $CO_2$ in the air, and effectively inhibits the irreversible chemical reaction on the surface of the particle to form a layer of sodium hydroxide and sodium carbonate layers without electrochemical activity.

The embodiments according to the present application cab effectively inhibit the amount of sodium hydroxide on the surface of positive electrode active material particles, prevent the bimolecular elimination reaction between hydroxide ions and C—F bonds and C—H bonds in a binder, and suppress the increase of brittleness of positive electrode plates caused by the increase of carbon-carbon double bonds, thus greatly reducing the probability of the rupture of positive electrode plates, and improving the mechanical properties of positive electrode plates, which is beneficial to improving the stability and safety performance of the sodium ion battery. In addition, the increase of the carbon-carbon double bonds in the binder is inhibited, and the viscosity of the slurry due to the high viscosity of the binder is prevented from becoming larger, and the gelation of the slurry is avoided. The quality of the slurry is improved, and the compacted density and consistency of the positive electrode plate are improved, thus increasing the capacity of the sodium ion battery.

Because of effectively reducing the amount of sodium hydroxide on the surface of positive electrode active materials, the reaction of sodium hydroxide with electrolyte salt in electrolyte is also prevented, reducing the consumption of sodium ions in the electrolyte, and thus increasing the capacity retention rate of the sodium ion battery. The production of hydrogen fluoride can also be reduced, thereby preventing the destruction of SEI film at the solid electrolyte interface by hydrogen fluoride, further reducing the consumption of electrolyte and sodium ions, and further improving the capacity retention rate of the battery. As a result of reducing the production of hydrogen fluoride gas, the corrosion of acidic hydrogen fluoride to the metal parts of the battery is also reduced, and the structural stability and safety performance of the battery are improved.

The embodiments according to the application also effectively reduce the amount of sodium carbonate on the surface of positive electrode active material particles, prevent the decomposition of sodium carbonate from the battery during charging and discharging to produce carbon dioxide gas, and inhibit the increase of internal pressure of the battery, which are beneficial to preventing the deformation of the battery cell caused by internal stress increasing, and preventing the phenomenon of bulging or leakage caused by stress and deformation, thus prolonging the battery life.

Since the amount of sodium hydroxide and sodium carbonate on the surfaces of the positive electrode active material particles is effectively suppressed, the surfaces of the particles adsorb fewer functional groups and heteroatoms, and the water absorption rate of the particle surfaces is significantly reduced, which improves the positive electrode interface, reduces the interface impedance, and improves the migration of electrons and sodium ions in the positive electrode active material particles, thereby effectively improving the capacity performance of the positive electrode active material.

In some embodiments, $0<x<0.35$; further, $0<x\le0.1$; even further, $0<x\le0.05$.

In some embodiments, $0.1\le\alpha\le0.3$; further, $0.1\le\alpha\le0.2$.

In some embodiments, $0.3\le\beta\le0.5$; further, $0.3\le\beta\le0.45$.

In some embodiments, $0.3\le\gamma\le0.5$; further, $0.3\le\gamma\le0.45$.

In some embodiments, $0\le z\le0.2$; further, $0<z\le0.2$; even further, $0<z\le0.1$.

In some embodiments, $0<\eta\le0.1$; further, $0<\eta\le0.05$.

In some embodiments, optionally, L may include one or more of the $Li^+$, $K^+$, and $Mg^{2+}$, and more optionally one or more of the $Li^+$ and $Mg^{2+}$.

In some embodiments, optionally, M may include one or more of $Li^+$, $Ni^+$, $Mg^{2+}$, $Mn^{2+}$, $Zn^{2+}$, $Co^{2+}$, $Ba^{2+}$, $Sr^2$, $Mn^{3+}$, $Al^{3+}$, $B^{3+}$, $Ti^{4+}$, $Sn^{4+}$, $Mo^{4+}$, $Mo^{5+}$ and $Mo^{6-}$. More optionally, M may include one or more of the $Li^+$, $Ni^{2+}$, $Mg^{2+}$, $Zn^{2+}$, $Co^{2+}$, $Ba^{2+}$, $Al^{3+}$, $B^{3+}$ and $Ti^{4+}$. Particularly optionally, M may include one or more of the $Ni^{2+}$, $Mg^{2+}$, $Al^{3+}$, $B^{3+}$, and $Ti^{4+}$. Even more optionally, M can include one or more of the $Ni^{2+}$, $Mg^{2+}$, and $Ti^{4+}$.

In some embodiments, the pH of the positive electrode active materials can be $\geq 10.5$, $\geq 10.8$, $\geq 11.0$, $\geq 11.2$, $\geq 11.5$, $\geq 11.7$, $\geq 11.9$, or $\geq 12.0$. Furthermore, the pH of the positive electrode active materials can be $\leq 13.0$, $\leq 12.8$, $\leq 12.5$, $\leq 12.3$, $\leq 12.2$, $\leq 12.0$, or $\leq 11.8$. Optionally, the pH of the positive electrode active materials is from 11.5 to 12.5.

If the pH of the positive electrode active material is in the proper range, the above effects can be better exerted, further improving the capacity performance of the positive electrode active material.

In some embodiments, the interlayer spacing $d_{003}$ of the 003 crystal planes of the positive electrode active material is optionally from 5.20 Å to 5.70 Å, further optionally from 5.40 Å to 5.60 Å, and even more optionally from 5.40 Å to 5.50 Å. After a great deal of research, the inventors found that when the interlayer spacing $d_{003}$ of the positive electrode active material is controlled in this range, the structure of the positive electrode active material is more stable which manifest as better cycling performance of the positive electrode active material; meanwhile, sodium ions are easier to be intercalated and deintercalated between the layers, which can improve the charge/discharge specific capacity and Coulomb efficiency of the positive electrode active material.

In some embodiments, optionally, the space group of the positive electrode active material is R3m. The positive electrode active material with such a crystal structure has good structure stability, which can improve the capacity and cycle performance of the positive electrode active material.

In some embodiments, optionally, the average particle diameter $D_v50$ of the positive electrode active material is from 2 μm to 25 μm, further optionally from 5 μm to 18 μm, and even more optionally 5 μm~15 μm. Controlling the $D_v50$ of the positive electrode active material in the appropriate range can make the sodium ion battery have good dynamic performance and high energy density at the same time.

In the above range, $D_v50$ of the positive electrode active material can also ensure proper specific surface area of the positive electrode active material, so that the positive electrode active materials not only have high electrochemical performance, but also reduce the side reaction on the surface of particles and gas production, thus improving the comprehensive performance of materials. Proper specific surface area of the positive electrode active material can reduce the liquid absorption during the preparation of the positive electrode slurry, and increase the solid content and particle dispersion uniformity in the positive electrode slurry, so it can improve the particle dispersion uniformity and compacted density of the positive electrode active material layer, thus increasing the energy density of the sodium ion battery, and improving the rate performance and cycle performance of the sodium ion battery.

In some embodiments, optionally, the $D_v99$ of positive electrode active material is from 15 μm to 80 μm, optionally from 20 μm to 60 μm, and even more optionally from 25 μm to 45 μm. The positive electrode active material contains less large particles, so that the effect can be better exerted. In particular, the high rate performance and cycle performance of the battery are further improved.

In some embodiments, optionally, the specific surface area of the positive electrode active material is from 0.5 $m^2/g$ to 7.0 $m^2/g$, further optionally from 0.8 $m^2/g$ to 3.0 $m^2/g$, even more optionally, from 0.85 $m^2/g$ to 1.2 $m^2/g$, and particularly optionally, from 0.9 $m^2/g$ to 1.1 $m^2/g$.

In some embodiments, the tapped density of the positive electrode active material is optionally from 1.5 $g/cm^3$ to 3.0 $g/cm^3$, further optionally from 1.8 $g/cm^3$ to 2.8 $g/cm^3$, and particularly optionally from 1.9 $g/cm^3$ to 2.5 $g/cm^3$. As the tapped density of positive electrode active materials is in a suitable range, it helps to allow the positive electrode active materials a higher compacted density, so that the sodium ion battery has a higher capacity performance and energy density. In particular, the first charge specific capacity and the first cycle Coulomb efficiency of the sodium ion battery using this positive electrode active material can be further improved.

In some embodiments, the compacted density of the positive electrode active material under 8 tons pressure is from 3.0 $g/cm^3$ to 5.0 $g/cm^3$, optionally from 3.5 $g/cm^3$ to 4.5 $g/cm^3$, and particularly optionally from 3.8 $g/cm^3$ to 4.1 $g/cm^3$. As the positive electrode active material has high compacted density, it is beneficial to the high capacity and energy density of sodium ion batteries. In this range, the higher the compacted density of the positive electrode active material, the higher the capacity and energy density of sodium ion batteries.

The pH of the positive electrode active materials is well known in the art, and can be measured with instruments and methods well-known in the art, for example, according to GB/T 9724-2007 Chemical Reagent pH Measurement General Rules.

The interlayer spacing $d_{003}$ of the 003 crystal plane of the positive electrode active material and the spatial group are well known in the art. An X-ray powder diffractometer can be used to determine the X-ray diffraction pattern of the positive electrode active material according to JIS K0131-1996 X-ray Diffraction Analysis General Rules to obtain, from which the interlayer spacing $d_{003}$ of the 003 crystal plane and the spatial group of the positive electrode active material can be obtained. For example, Bruker D8 Discover X-ray diffractometer of Bruker AxS in Germany can be used, wherein $CuK_\alpha$ ray is used as the radiation source, the wavelength of the radiation is $\lambda=1.5406$ Å, the scanning range of 2θ angle is from 100 to 100° and the scanning rate is 0.0696°/s.

The specific surface area of positive electrode active is well known in the art, and it can be measured with instruments and methods known in the art. For example, it can be measured according to GB/T 19587-2017 Gas Adsorption BET Method to Determine the Specific Surface Area of Solid Substances. It can be measured using the nitrogen adsorption specific surface area analysis test method, and calculated using the BET (Brunauer Emmett Teller) method. Among others, the nitrogen adsorption specific surface area analysis test can be carried out using Tri Star II 3020 specific surface and pore analyzer of Micromeritics, USA.

The $D_v50$ and $D_v99$ of positive electrode active materials are known in the art and can be determined by the instruments and methods known in the art. For example, it can be easily determined according to GB/T 19077-2016 Particle Size Distribution Laser Diffraction Method using a laser particle size analyzer, such as Mastersizer 2000E laser particle size analyzer from Malvern Instruments Ltd., UK. Among others, the definitions of $D_v50$ and $D_v99$ are as follows:

$D_v50$: The particle size of positive electrode active materials when the cumulative volume distribution percentage reaches 50%;

$D_v99$: The particle size positive electrode active materials when the cumulative volume distribution percentage reaches 99%.

The tapped density of positive electrode active materials can be measured by the instruments and methods known in the art. For example, it can be measured according to GB/T5162-2006 Powder Tapped Density Method of Positive Electrode Active Materials by means of a tapped density tester, such as FZS4-4B tapped density tester.

The compacted density of the positive electrode active materials can be measured by the instruments and methods known in the art, such as according to GB/T24533-2009 standard by means of an electronic pressure testing machine, such as UTM7305 electronic pressure testing machine.

Next, the preparation method of the positive electrode active materials in the present application will be described. According to the preparation method, the aforesaid positive electrode active material can be prepared. The preparation method includes the following steps:

S10, mixing a L source, Na source, M source, Cu source, Fe source, Mn source and X source according to the preset proportion and then conducting a thermal treatment in an oxygen-containing atmosphere to obtain a sodium transition metal oxide;

S20, washing the sodium transition metal oxide with washing solution, wherein the washing solution has a pH of from 3 to 13, optionally from 6 to 12;

S30, re-washing the washed sodium transition metal oxide with deionized water; and S40, drying the re-washed sodium transition metal oxide to obtain the positive electrode active material.

It should be understood that in step S10, in the mixed material after mixing, the ratios of the L source, the M source, and the X source are each independently ≥0. When the ratio is equal to 0, the corresponding element ratio in the obtained positive electrode active material is also 0.

In step S10, as an example, the L-source may be selected from one or more of the carbonate, nitrate, acetate, oxalate, hydroxide, chloride, and oxide containing L. The Na source can be selected from sodium carbonate, sodium bicarbonate, sodium nitrate, sodium acetate, sodium oxalate, sodium hydroxide, sodium chloride and sodium oxide in one or several. The M source can be selected from one or more of the carbonate, nitrate, acetate, oxalate, hydroxide, chloride, and oxide containing M. The Cu source can be selected from copper carbonate, copper nitrate, copper acetate, copper oxalate, copper hydroxide, copper chloride and copper oxide one or several. The Fe source can be selected from ferric carbonate, ferric nitrate, ferric acetate, ferric oxalate, ferric hydroxide, ferric chloride and iron oxide one or more. The Mn source can be selected from manganese carbonate, manganese nitrate, manganese acetate, manganese oxalate, manganese hydroxide, manganese chloride and manganese oxide in one or several. The X source can be selected from one or more of $NH_4X$ and $NaX$. For example, when X is $F^-$, the F source can be one or more of ammonium fluoride ($NH_4F$) and sodium fluoride ($NaF$).

In some embodiments, optionally, when mixing the materials in step S10, the actual mass of L source is controlled to be 100% to 110% of the theoretical mass of L source, and/or the actual mass of Na source is controlled to be 100% to 110% of the theoretical mass of Na source, in which the theoretical mass refers to the required mass calculated according to the stoichiometric ratio of the molecular formula of the positive active material. In mixing, by making the L source and Na source moderately excessive, it helps to keep the pH value of the finally obtained positive electrode active material within the aforementioned range. If the actual mass of L source and Na source is too large, the corresponding oxides will be generated on the surface of the material during the thermal treatment process, which is likely to cause a higher pH value of the active material of the positive electrode. If too small, the electrochemical properties of the positive electrode active material will tend to decrease.

In step S10, a ball mill mixer or a high-speed mixer can be used for mixing. As an example, the L source, the Na source, the M source, the Cu source, the Fe source, the Mn source, and the X source are added to a high-speed mixer for mixing according to a stoichiometric ratio. The mixing time can be from 0.5 h to 2 h.

In step S10, the thermal treatment may include adding the mixed materials into an atmosphere sintering furnace, and sintering in an oxygen-containing atmosphere. The sintering atmosphere is an air atmosphere or an oxygen atmosphere, optionally an oxygen atmosphere. The sintering temperature can be from 700° C. to 1100° C., optionally from 850° C. to 1000° C. The sintering time can be from 2 h to 30 h, optionally from 10 h to 20 h.

The sintering temperature and heating time will affect the stability of L element and Na element in the structure of the positive electrode active material. In the above range, the higher the sintering temperature and the longer the heating time, the more stable the L element and Na element are in the structure of the positive electrode active material, the easier it is to control the pH value of the positive electrode active material in the foregoing range, and the better the stability of the final cathode active material to air and moisture as well as its structural stability.

In some embodiments, optionally, the relative humidity of the oxygen-containing atmosphere is 0%~20%, more optionally 0%~10%, particularly optionally 0%~5%. This is beneficial to controlling the pH value of the positive electrode active material in the foregoing range, and to improving the stability of the final cathode active material to air and moisture as well as its structural stability.

In some embodiments, optionally before step S20, it also includes step S40 for crushing treatment. In step S40, crushing treatment is carried out on the sodium transition metal oxide obtained in step S10, and the average particle diameter of the sodium transition metal oxide $D_v50$ is from 2 μm to 25 μm, more optionally from 5 μm to 15 μm. This is beneficial to making the finally obtained positive electrode active materials have better particle size distribution and specific surface area. In particular, when crushing treatment is carried out on the sodium transition metal oxide obtained in step S10, the particle size of the material to be washed in the subsequent steps S20 and S30 is smaller, so the contact between the particle and the washing solution and deionized water is more sufficient, and the washing effect is better, which is beneficial for keeping the pH value of the positive electrode active material in the foregoing range.

In some embodiments, the $D_v99$ of sodium-transition metal oxides obtained by crushing treatment in step S40 is from 15 μm to 80 μm, optionally from 20 μm to 60 μm. It is more beneficial to controlling the pH of the prepared positive electrode active materials in the foregoing range, and allowing better particle size distribution and specific surface area.

In step S40, there is no special restriction on the way of crushing and it can be selected according to actual requirements, such as the use of particle crushers.

In step S20, the washing solution includes detergent and deionized water, such as a mixture of detergent and deionized water. The detergent may include one or more of acetic acid, oxalic acid, hydrochloric acid, sulfuric acid, nitric acid, carbonate, phosphoric acid, sodium carbonate, sodium bicarbonate, sodium hydroxide and ammonia water. By regulating the types and concentration of detergents, the pH value of the washing solution can be controlled in the range of 3-13, so that the pH value of the finally obtained positive electrode active material can be controlled in the foregoing range.

In step S20, the washing kettle with stirring can be used for rewashing treatment. The washing solution and sodium transition metal oxide are added into the washing kettle and washing treatment is performed under stirring. In the mixture of the washing solution and sodium transition metal oxide, the mass percentage of sodium transition metal oxide (hereinafter referred to as solid content) is optionally below 70 wt % and more optionally from 20 wt % to 50 wt %. The washing temperature is optionally from 20° C. to 80° C. and more optionally from 20° C. to 50° C. The stirring speed is optionally below 800 rpm (revolutions per minute) and more optionally from 100 rpm to 400 rpm. The stirring time is optimized to be below 60 min and more optionally from 5 min to 30 min. After washing, the sodium transition metal oxide is separated from the washing solution. For example, centrifugation or filtration can be used to separate.

By making the solid content in the mixture of washing solution and sodium transition metal oxide below 70 wt %, the washing treatment effect can be improved, and the pH value of the finally obtained positive electrode active material can be controlled in the foregoing range.

Further, by making the mixing speed, washing temperature and washing time in the proper range, better washing effect can be obtained, and the pH value of the finally obtained positive electrode active material can be controlled in the foregoing range. In the range mentioned above, the higher the mixing speed during the washing treatment, the higher the washing temperature and the longer the washing time, then the better the washing effect.

In step S20, the washing times of the sodium transition metal oxides by washing solution can be from 1 to 5 times, optionally from 2 to 3 times.

Through the above washing treatment, the positive electrode active material has better pH value and surface property, and it can also increase the interlayer spacing $d_{003}$ of 003 crystal plane of the positive electrode active material.

In step S30, the washing kettle with stirring can be used for rewashing treatment. Deionized water and the sodium transition metal oxide that has been washed in step S20 are added into the washing kettle, and re-washing treatment is performed under stirring. The mass ratio of sodium transition metal oxide to deionized water (hereinafter referred to as solid-liquid ratio) is optionally from 0.8 to 1.2, e.g. 1. The washing temperature can be from 20° C. to 80° C., for example 20° C. to 50° C. The stirring speed can be less than 800 rpm (revolutions per minute), for example from 100 rpm to 400 rpm. The stirring time can be below 60 min, for example from 5 min to 30 min. After washing, the sodium transition metal oxide is separated from the deionized water, for example by centrifugation or filtration.

The positive electrode active material whose pH value is controlled within the foregoing range can be finally obtained through the re-washing step S30.

In step S30, the times of washing sodium transition metal oxide with deionized water can be from 1 to 5 times, optionally from 2 to 3 times.

In step S40, sodium transition metal oxides after rewashing can be dried in a vacuum environment, for example in a vacuum oven. The drying temperature may be from 25° C. to 150° C., such as form 80° C. to 120° C. The drying time may be from 0.5 h to 24 h, such as from 3 h to 12 h.

In the preparation process of positive electrode active materials, by comprehensively regulating one or more factors including the actual quality of the L source in the raw material, the actual quality of the sodium source, the temperature and heating time of the thermal treatment, the humidity of the oxygen-containing atmosphere during the thermal treatment, the particle size of the sodium transition metal oxide, the solid content during the washing treatment, the pH of the washing solution, the stirring speed of washing treatment, washing temperature and washing time, number of washing treatments, solid-liquid ratio during re-washing treatment, stirring speed during re-washing treatment, washing temperature and washing time, and number of re-washing treatments, etc., the pH value of the finally obtained positive electrode active material can be controlled in the foregoing range, and the stability of L and Na elements in the structure of the positive electrode active material can be improved, so that the positive electrode active material has higher comprehensive electrochemical performance.

Sodium Ion Battery

The present application provides a sodium ion battery comprising the positive electrode active material described in the present application.

The sodium ion battery according to the present application has good comprehensive electrochemical performance due to the use of the positive electrode active material according to the present application, and it has high capacity performance, including a high first cycle charge/discharge specific capacity and a high first cycle Coulomb efficiency, as well as a good cycle performance.

As an example, the sodium ion battery includes a positive electrode plate, a negative electrode plate, a separator and an electrolyte. The positive electrode plate, the separator and the negative electrode plate are laminated or wound sequentially, so that the separator is between the positive electrode plate and the negative electrode plate to isolate one from the other, affording an electrode assembly; the electrode assembly is placed in an outer package, the electrolyte is injected and the outer package is sealed, giving the sodium ion battery.

[Positive Electrode Plates]

The positive electrode plate comprises a positive electrode current collector and a positive electrode active material layer stacked on the positive electrode current collector. The positive electrode active material layer includes the positive electrode active material described in the present application. For example, a positive electrode current collector has two opposite surfaces in the direction of its thickness, and a positive electrode active material layer is formed on either or both of the two surfaces of the positive electrode current collector.

In some embodiments, the positive electrode active material layer may also include a binder. There are no specific restrictions on the type of binder. Those of ordinary skill in the art can choose according to actual requirements. As an example, the binder used for positive electrode plates may include one or more of the styrene-butadiene rubber (SBR), water based acrylic resin), carboxymethyl cellulose sodium (CMC-Na), polyvinylidene fluoride (PVDF polytetrafluoroethylene (PTFE), ethylene-vinyl acetate (EVA), and polyvinyl alcohol (PVA).

In some embodiments, the positive electrode active substance layer may also include a conductive agent. There are no specific restrictions on the type of conductive agent, so those of ordinary skill in the art can choose according to the actual requirements. As an example, the conductive agents used for positive electrode plates may include one or more of graphite, superconducting carbon, acetylene black, carbon black, Ketjen black, carbon dots, carbon nanotubes, graphene, and carbon nanofibers.

In some embodiments, the positive electrode current collector may be made of metal foil, carbon-coated metal foil or porous metal plate, optionally aluminum foil.

The positive electrode plates can be prepared according to the conventional methods in the art. Usually the positive electrode active material and the optional conductive agent and binder are dispersed in a solvent (such as N-methyl pyrrolidone, or NMP for short) to form a uniform positive electrode slurry, and the positive electrode slurry is coated on the positive electrode current collector, and after the steps of drying, rolling, etc., a positive electrode plate is obtained.

[Negative Electrode Plates]

A negative electrode plate may be either a metal sodium sheet or a plate comprising a negative electrode current collector and a negative electrode active substance layer stacked on the negative electrode current collector. For example, a negative electrode current collector has two opposite surfaces in the direction of its thickness, and a negative electrode active material layer is formed on either or both of the two surfaces of the negative electrode current collector.

The negative electrode active substance layer includes negative electrode active material. As an example, the negative electrode active materials may include one or more of natural graphite, artificial graphite, mesophase carbon microspheres (MCMB), hard carbon and soft carbon, optionally hard carbon.

In some embodiments, the negative electrode active substance layer may also include a conductive agent. There are no specific restrictions on the type of conductive agent, so those of ordinary skill in this field can choose according to the actual requirements. As an example, the conductive agents used for negative electrode plates may include one or more of the graphite, superconducting carbon, acetylene black, carbon black, Ketjen black, carbon dots, carbon nanotubes, graphene and carbon nanofibers.

In some embodiments, the negative electrode active substance layer may also include a binder. There are no specific restrictions on the type of binder. Those of ordinary skill in the art can choose according to actual requirements. As an example, the binder used for negative electrode plates may include one or more of the styrene-butadiene rubber (SBR) and water-based acrylic resin (water-based acrylic resin).

In some embodiments, the negative active substance layer may also include a thickener. The thickener may be carboxymethyl cellulose sodium (CMC-Na).

In some embodiments, the negative electrode current collector may be made of metal foil, carbon-coated metal foil or porous metal plate, optionally copper foil.

The negative electrode plate can be prepared according to the conventional methods in the art. Generally, the negative electrode material and the optional conductive agent, binder and thickener are dispersed in a solvent, which solvent can be deionized water, to form uniform negative slurry, the negative electrode slurry is coated on the negative electrode current collector, and after drying, cold pressing and other processes, a negative electrode plate is obtained.

[Separator]

The sodium ion battery provided in the present application has no special restrictions on the separator and it can be selected from any known porous separator with electrochemical and chemical stability. For example, the separator may be one or more single or multi-layer films of fiberglass, non-woven fabric, polyethylene, polypropylene, and polyvinylidene fluoride.

[Electrolyte]

In the sodium ion batteries provided in the present application, the electrolytes may include organic solvents and electrolyte sodium salts. As an example, organic solvents may include one or more of ethylene carbonate (EC), propylene carbonate (PC), ethyl methyl carbonate (EMC) and diethyl carbonate (DEC). The electrolyte sodium salt may include one or more of $NaPF_6$, $NaClO_4$, $NaBiCl_4$, $NaSO_3CF_3$ and $Na(CH_3)C_6H_4SO_3$.

The present application has no special restrictions on the shape of the sodium ion battery, which may be cylindrical, square, or any other arbitrary shape. FIG. 1 illustrates an example of a square-shaped sodium ion battery 5.

In some embodiments, the sodium ion battery may include an outer package for encapsulating a positive electrode plate, a negative electrode plate, a separator, and an electrolyte.

In some embodiments, the outer packaging of the sodium ion battery can be a soft package, such as a bag-type soft package. Soft package material can be plastic, for example, it can include one or more of polypropylene (PP), polybutylene terephthalate (PBT), polybutylene succinate (PBS), etc. The outer packaging of sodium ion battery can also be a hard shell, such as hard plastic shell, aluminum shell, steel shell, etc.

Figure 2:
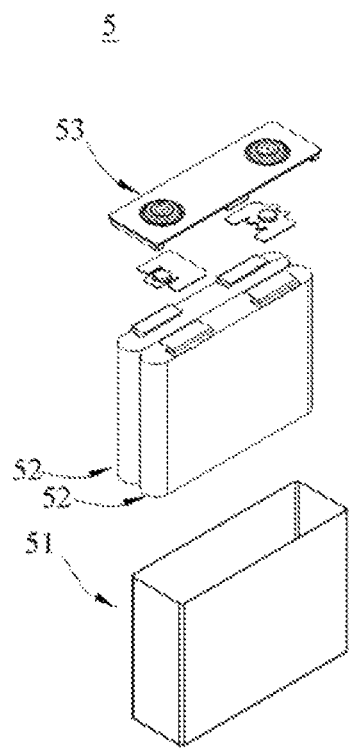
FIG. 2 is the decomposition diagram of FIG. 1.

In some embodiments, with reference to FIG. 2, the outer packaging may include shell 51 and cover plate 53. The shell 51 may include a base plate and side plates attached to the base plate, wherein the base plate and the side plate are enclosed to form a housing cavity. The shell 51 has an opening connected with the housing cavity, and cap plate 53 can cover the opening to close the housing cavity.

The positive electrode plate, the negative electrode plate and the separator can be laminated or wound to form a laminated structure electrode assembly or a wound structure electrode assembly 52. The electrode assembly 52 is encapsulated in the housing cavity. The electrolyte is infiltrated into the electrode assembly 52.

The number of electrode assembly 52 contained in the sodium ion battery 5 can be one or several, which can be adjusted according to the actual needs.

In some embodiments, the sodium ion battery can be assembled into a battery module. The number of sodium ion battery in the battery module can be multiple, and the specific amount can be adjusted according to the application and capacity of the battery module.

Figure 3:
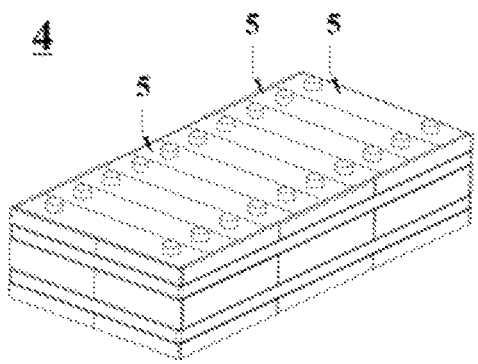
FIG. 3 is a schematic diagram of an embodiment of the battery module.

FIG. 3 illustrates an example of a battery module 4. With reference to FIG. 3, in the battery module 4, multiple sodium-ion batteries 5 may be arranged in sequence along the length of the battery module 4. Of course, it can also be arranged in any other way. Further, the multiple sodium ion batteries 5 can be fixed through a fastener.

Optionally, the battery module 4 can also include a housing with a holding space in which a plurality of sodium ion batteries 5 are contained therein.

In some embodiments, the battery modules aforesaid can also be assembled into a battery pack, which contain a number of battery modules that can be adjusted according to the battery pack's application and capacity.

Figure 4:
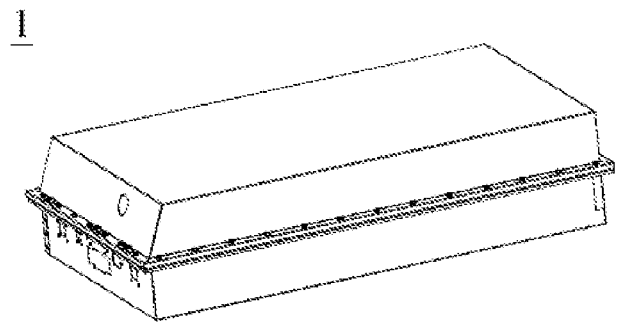
FIG. 4 is a schematic diagram of an embodiment of the battery pack.
Figure 5:
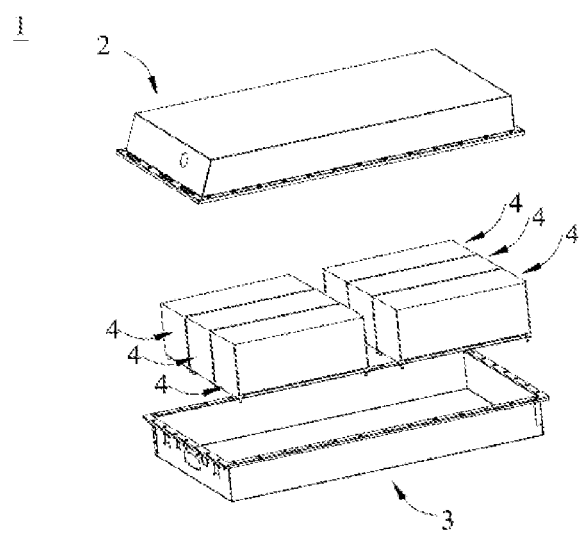
FIG. 5 is the decomposition diagram of FIG. 4.

FIGS. 4 and 5 illustrate the battery pack 1 as an example. Referring to FIGS. 4 and 5, in the battery pack 1, a battery box and multiple battery modules 4 contained in the battery box are included. The battery box includes the upper box 2 and the lower box 3, wherein the upper box 2 can cover the lower box 3 to form a closed space for containing the battery modules 4. Multiple battery modules 4 can be arranged in any way in the battery box.

Apparatus

The application also provides an apparatus comprising the sodium ion battery described in the application. The sodium ion battery may be used as a power source of the apparatus or as an energy storage unit of the apparatus. The apparatus may include, but not limited to, mobile apparatus (e. g. mobile phones, laptops, etc.), electric vehicles (e. g. pure electric vehicles, hybrid electric vehicles, plug-in hybrid electric vehicles, electric bicycles, electric scooters, electric golf carts, electric trucks, etc.), electric trains, ships and satellites, energy storage systems, etc.

The apparatus may contain a sodium ion battery, a battery module or a battery pack according to its usage requirements.

Figure 6:
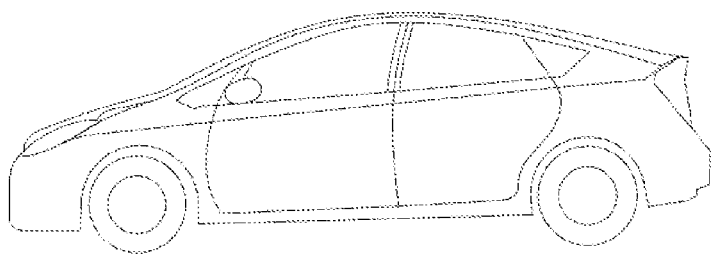
FIG. 6 is a schematic diagram of an embodiment of an apparatus having the sodium ion battery as a power source.

FIG. 6 illustrates an example of an apparatus. The apparatus is a pure electric vehicle, hybrid electric vehicle, or plug-in electric hybrid electric vehicle, etc. In order to meet the high power and high energy density requirements of the apparatus, a battery pack or a battery module can be used.

Another example of an apparatus can be a mobile phone, tablet, laptop, etc. The apparatus is usually lightweight and can be powered by a sodium ion battery.

EXAMPLES

The following examples describe more specifically the content of the disclosure of the present application, which are used only for explanatory illustration, since the modifications and changes made within the scope of the disclosure of the present application will be apparent to those of ordinary skill in the art. Unless otherwise stated, all parts, percentages, and ratios reported in the following examples are based on weights, and all reagents used in the examples can be purchased or synthesized by conventional methods, and can be used directly without further treatment, and the instruments used in the examples can be purchased.

Example 1

Preparation of Positive Electrode Active Materials

Sodium carbonate ($Na_2CO_3$), copper oxide (CuO), ferric oxide ($Fe_2O_3$) and manganese carbonate ($MnCO_3$) were evenly mixed according to molar ratio of $Na_2CO_3$:CuO: $Fe_2O_3$:$MnCO_3$=0.35:0.1:0.225:0.45, i.e. making the actual mass of Na source in the mixture be 100% of the theoretical mass; then, the mixture was kept at 950° C. for 12 hours in an air atmosphere with a relative humidity of 4%, and after natural cooling a sodium transition metal oxide $Na_{0.7}Cu_{0.1}Fe_{0.45}Mn_{0.45}O_2$ was obtained. The obtained sodium transition metal oxide was ground into $D_v50 \approx 8$ μm and $D_v99 \approx 45$ μm; then mixed with an appropriate amount of washing solution with pH=6 (acetic acid as the detergent) to form a mixture having a solid content of 30 wt %, stirred at a stirring speed of 200 rpm for 10 min at 30° C., wherein the washing was repeated for 3 times; then re-washed with deionized water of the same quantity as the sodium transition metal oxide, wherein the re-washing was repeated for 2 times; and then dried under 100° C. for 8 hours to obtain the positive electrode active material E1. The obtained positive electrode active material E1 was measured to have the following properties: pH=10.5, the specific surface area=1.0 m²/g, $D_v50 \approx 8$ μm, $D_v99 \approx 45$ μm, the tapped density=2.0 g/cm³, and the compacted density=3.8 g/cm³.

Preparation of Button Battery

1) Preparation of Positive Electrode Plate

The positive electrode active material as prepared, the conductive agent acetylene black and the binder polyvinylidene fluoride (PVDF) in a weight ratio of 80:15:5 were stirred evenly in a proper amount of N-methyl pyrrolidone (NMP) to form a uniform positive electrode slurry. The positive electrode slurry was coated onto an aluminum foil using as a positive electrode current collector, dried and rolled to form a circular plate with a diameter of 14 mm, obtaining the positive electrode plate.

2) Preparation of Negative Electrode Plate

A metal sodium sheet was used as the negative electrode plate.

3) A separator made of glass fiber film was used.

4) Preparation of Electrolyte

An equal volume of ethylene carbonate (EC) and diethyl carbonate (DEC) were mixed uniformly to form an organic solvent, and then sodium perchlorate $NaClO_4$ was uniformly dissolved in the above organic solvent to form an electrolyte. The concentration of sodium perchlorate was 1 mol/L.

5) The positive electrode plate, the separator and the negative electrode plate were stacked in order, and the electrolyte was added, and a CR2032 button battery was obtained after sealing. The battery assembly was carried out in a glove box filled with argon.

The preparation methods of Examples 2-29 are similar to those of Example 1, there are some differences that the positive electrode active materials E2-E29 in Table 1 were respectively prepared by adjusting the process parameters in the preparation methods of the positive electrode active materials.

The preparation methods of Comparative Examples 1-12 are similar to Example 1, there are some differences that the positive electrode active materials D1-D12 in Table 1 were respectively prepared by adjusting the process parameters in the preparation methods of the positive electrode active materials.

Test Methods (1) pH Value of Positive Electrode Active Materials 5 grams of positive electrode active material powders were dispersed into 45 grams of deionized water, so that the weight ratio of positive electrode active material to deionized water was 1:9, fully stirred for 30 minutes, and held in a constant temperature water bath at 25° C. for 1.5 hours to obtain the solution for test. Also, pH calibration solutions were placed in a constant temperature water bath pot at 25° C. Deionized water (abbreviated as DI water) was used to clean the electrode, and a clean paper was used to absorb the water on the electrode. The calibration solution with pH=6.86 was used to locate and calibrate the electrode. Then, the electrode was cleaned again according to the above steps, and the calibration solutions with pH=4.00, 9.18 and 12.00 were used to calibrate the slope and the electrode was cleaned again. Then, the supernatant of the solution for test was taken out and tested for pH value at 25° C. constant temperature using LEI-CI PHS-3C pH meter combined with E-201-C glass electrode, wherein the average value of three tests was recorded as the pH value of the positive electrode active material.

(2) Interlayer Spacing $d_{003}$ of 003 Crystal Plane and Spatial Group of Positive Electrode Active Materials In a dry room or glove box, the positive electrode active material sample to be tested was ground in an agate mortar and sieved through a 350-mesh sieve. An appropriate amount of the sieved material was taken and put it into the middle of the groove of a sample holder so that the loose sample powders were slightly higher than the plane of the sample holder. The surface of the powder sample was pressed lightly by a glass slide to make the surface of the powder sample to be flat and consistent with the plane of the frame, and the excess powders were scraped off. After the sample preparation, the sample was tested using Bruker D8 Discover X-ray diffractometer of the German Company Bruker AxS, using $CuK_\alpha$ ray as the source of radiation in step-scan mode (step length 0.01671 degree, step 0.24 s), wherein the wavelength of the X-ray was $\lambda=1.5406$ Å and the scanning $2\theta$ angle range was from $10°$ to $100°$. After the test was completed, the interlayer spacing $d_{003}$ of the 003 crystal plane could be obtained from the angle corresponding to the 003 crystal plane according to the Bragg equation $2d \cdot \sin \theta = \lambda$. The space group of the positive electrode active material could be obtained and confirmed by comparing the XRD diffraction peaks of the material with the standard data in the XRD analysis software.

(3) Capacity Performance of Positive Electrode Active Materials

Under the normal temperature ($23\pm2°$ C.) and atmospheric pressure (0.1 MPa), the sodium ion button batteries prepared in the Examples and Comparative Examples were charged at a constant current of 0.1 C to a voltage of 4.05V. The charge capacity at this point was recorded as the first cycle charge specific capacity of the button battery. Then, the battery was allowed to stand for 5 min, and then discharge at a constant current of 0.1 C to a voltage of 2.5V, and allowed to stand for 5 minutes. This was a charge and discharge cycle. The discharge capacity was recorded as the first cycle discharge specific capacity of the sodium ion battery.

The first cycle Coulomb efficiency (%) of the sodium ion button battery=the first cycle discharge specific capacity/the first cycle charge specific capacity×100%.

The test results of Examples 1 to 29 and Comparative Examples 1 to 12 are shown in Table 2.

From the comparative analysis between Examples 1-24 and Comparative Examples 1-2, between Example 25 and Comparative Examples 3-4, between Example 26 and Comparative Examples 5-6, between Example 27 and Comparative Examples 7-8, between Example 28 and Comparative Example 9-10, and between Example 29 and Comparative Examples 11-12, it can be seen that when the pH value of positive electrode active material is too high or too low, the first cycle charge specific capacity and the first cycle Coulomb efficiency of the positive electrode active material are lower. When the pH value of the positive electrode active materials of the Examples of the application is within the range of from 10.5 to 13, the corresponding battery shows higher first cycle charge/discharge specific capacity and first cycle Coulomb efficiency, and has higher capacity performance and Coulomb efficiency.

Furthermore, according to the data of Example 7-15, the first cycle charge/discharge specific capacity and the first cycle Coulomb efficiency of the positive electrode active material can be improved when the interlayer spacing $d_{003}$ of the 003 crystal plane of the positive electrode active material is in the range of from 5.20 Å to 5.70 Å.

Furthermore, it can be seen from the data of Examples 16-24 that the first cycle charge/discharge specific capacity and the first cycle Coulomb efficiency of the positive electrode active material can be improved when the average particle diameter $D_v50$ of the positive electrode active material is in the range of from 2 μm to 25 μm.

To sum up, as the positive electrode active material provided in the present application has a special chemical composition, and the pH of the positive electrode active material is from 10.5 to 13, the sodium ion batteries with this material have a high first cycle charge/discharge specific capacity and first cycle Coulomb efficiency, and have a high capacity and Coulomb efficiency.

The above only illustrates some specific embodiments for implementation of the present application, but the scope of the present application is not limited thereto. Those of ordinary skill in the technical field of the present application may, within the scope disclosed herein, readily conceive of various equivalent modifications or substitutions, which shall be encompassed by the scope of protection of the present application. Therefore, the scope of the present application shall be subject to the appended claims.

TABLE 1

Positive Electrode Active Materials and Raw Materials

| | Positive electrode active materials | Raw materials and molar ratio |
|---|---|---|
| E1 | $Na_{0.7}Cu_{0.1}Fe_{0.45}Mn_{0.45}O_2$ | $Na_2CO_3$:CuO:$Fe_2O_3$:$MnCO_3$ = 0.35:0.1:0.225:0.45 |
| E2 | $Na_{0.7}Cu_{0.1}Fe_{0.45}Mn_{0.45}O_2$ | $Na_2CO_3$:CuO:$Fe_2O_3$:$MnCO_3$ = (0.35 × 1.02):0.1:0.225:0.45 |
| E3 | $Na_{0.7}Cu_{0.1}Fe_{0.45}Mn_{0.45}O_2$ | $Na_2CO_3$:CuO:$Fe_2O_3$:$MnCO_3$ = (0.35 × 1.03):0.1:0.225:0.45 |
| E4 | $Na_{0.7}Cu_{0.1}Fe_{0.45}Mn_{0.45}O_2$ | $Na_2CO_3$:CuO:$Fe_2O_3$:$MnCO_3$ = (0.35 × 1.04):0.1:0.225:0.45 |
| E5 | $Na_{0.7}Cu_{0.1}Fe_{0.45}Mn_{0.45}O_2$ | $Na_2CO_3$:CuO:$Fe_2O_3$:$MnCO_3$ = (0.35 × 1.045):0.1:0.225:0.45 |
| E6 | $Na_{0.7}Cu_{0.1}Fe_{0.45}Mn_{0.45}O_2$ | $Na_2CO_3$:CuO:$Fe_2O_3$:$MnCO_3$ = (0.35 × 1.045):0.1:0.225:0.45 |
| E7 | $Na_{0.7}Cu_{0.1}Fe_{0.45}Mn_{0.45}O_2$ | $Na_2CO_3$:CuO:$Fe_2O_3$:$MnCO_3$ = (0.35 × 1.045):0.1:0.225:0.45 |
| E8 | $Na_{0.7}Cu_{0.1}Fe_{0.45}Mn_{0.45}O_2$ | $Na_2CO_3$:CuO:$Fe_2O_3$:$MnCO_3$ = (0.35 × 1.045):0.1:0.225:0.45 |

TABLE 1-continued

Positive Electrode Active Materials and Raw Materials

| | Positive electrode active materials | Raw materials and molar ratio |
|---|---|---|
| E9 | $Na_{0.7}Cu_{0.1}Fe_{0.45}Mn_{0.45}O_2$ | $Na_2CO_3:CuO:Fe_2O_3:MnCO_3 =$ $(0.35 \times 1.045):0.1:0.225:0.45$ |
| E10 | $Na_{0.7}Cu_{0.1}Fe_{0.45}Mn_{0.45}O_2$ | $Na_2CO_3:CuO:Fe_2O_3:MnCO_3 =$ $(0.35 \times 1.045):0.1:0.225:0.45$ |
| E11 | $Na_{0.7}Cu_{0.1}Fe_{0.45}Mn_{0.45}O_2$ | $Na_2CO_3:CuO:Fe_2O_3:MnCO_3 =$ $(0.35 \times 1.045):0.1:0.225:0.45$ |
| E12 | $Na_{0.7}Cu_{0.1}Fe_{0.45}Mn_{0.45}O_2$ | $Na_2CO_3:CuO:Fe_2O_3:MnCO_3 =$ $(0.35 \times 1.045):0.1:0.225:0.45$ |
| E13 | $Na_{0.7}Cu_{0.1}Fe_{0.45}Mn_{0.45}O_2$ | $Na_2CO_3:CuO:Fe_2O_3:MnCO_3 =$ $(0.35 \times 1.045):0.1:0.225:0.45$ |
| E14 | $Na_{0.7}Cu_{0.1}Fe_{0.45}Mn_{0.45}O_2$ | $Na_2CO_3:CuO:Fe_2O_3:MnCO_3 =$ $(0.35 \times 1.045):0.1:0.225:0.45$ |
| E15 | $Na_{0.7}Cu_{0.1}Fe_{0.45}Mn_{0.45}O_2$ | $Na_2CO_3:CuO:Fe_2O_3:MnCO_3 =$ $(0.35 \times 1.045):0.1:0.225:0.45$ |
| E16 | $Na_{0.7}Cu_{0.1}Fe_{0.45}Mn_{0.45}O_2$ | $Na_2CO_3:CuO:Fe_2O_3:MnCO_3 =$ $(0.35 \times 1.045):0.1:0.225:0.45$ |
| E17 | $Na_{0.7}Cu_{0.1}Fe_{0.45}Mn_{0.45}O_2$ | $Na_2CO_3:CuO:Fe_2O_3:MnCO_3 =$ $(0.35 \times 1.045):0.1:0.225:0.45$ |
| E18 | $Na_{0.7}Cu_{0.1}Fe_{0.45}Mn_{0.45}O_2$ | $Na_2CO_3:CuO:Fe_2O_3:MnCO_3 =$ $(0.35 \times 1.045):0.1:0.225:0.45$ |
| E19 | $Na_{0.7}Cu_{0.1}Fe_{0.45}Mn_{0.45}O_2$ | $Na_2CO_3:CuO:Fe_2O_3:MnCO_3 =$ $(0.35 \times 1.045):0.1:0.225:0.45$ |
| E20 | $Na_{0.7}Cu_{0.1}Fe_{0.45}Mn_{0.45}O_2$ | $Na_2CO_3:CuO:Fe_2O_3:MnCO_3 =$ $(0.35 \times 1.045):0.1:0.225:0.45$ |
| E21 | $Na_{0.7}Cu_{0.1}Fe_{0.45}Mn_{0.45}O_2$ | $Na_2CO_3:CuO:Fe_2O_3:MnCO_3 =$ $(0.35 \times 1.045):0.1:0.225:0.45$ |
| E22 | $Na_{0.7}Cu_{0.1}Fe_{0.45}Mn_{0.45}O_2$ | $Na_2CO_3:CuO:Fe_2O_3:MnCO_3 =$ $(0.35 \times 1.045):0.1:0.225:0.45$ |
| E23 | $Na_{0.7}Cu_{0.1}Fe_{0.45}Mn_{0.45}O_2$ | $Na_2CO_3:CuO:Fe_2O_3:MnCO_3 =$ $(0.35 \times 1.045):0.1:0.225:0.45$ |
| E24 | $Na_{0.7}Cu_{0.1}Fe_{0.45}Mn_{0.45}O_2$ | $Na_2CO_3:CuO:Fe_2O_3:MnCO_3 =$ $(0.35 \times 1.045):0.1:0.225:0.45$ |
| E25 | $Na_{0.9}Cu_{0.3}Fe_{0.3}Mn_{0.3}Ti_{0.1}O_2$ | $Na_2CO_3:CuO:Fe_2O_3:MnCO_3:TiO_2 =$ $(0.45 \times 1.047):0.3:0.15:0.15:0.1$ |
| E26 | $NaCu_{0.1}Fe_{0.35}Mn_{0.45}Mg_{0.1}O_2$ | $Na_2CO_3:CuO:Fe_2O_3:MnCO_3:MgO =$ $0.5:0.1:0.175:0.225:0.1$ |
| E27 | $Li_{0.05}Na_{0.9}5Cu0.2Fe_{0.3}Mn_{0.4}Ni_{0.1}O_2$ | $Li_2CO_3:Na_2CO_3:CuO:Fe_2O_3:Mn_2O_3:NiO =$ $(0.025 \times 1.047):(0.475 \times 1.047):0.2:0.15:0.2:0.1$ |
| E28 | $Mg_{0.05}Na_{0.9}5Cu_{0.15}Fe_{0.4}Mn_{0.4}Al_{0.05}O_2$ | $MgO:Na_2CO_3:CuO:Fe_2O_3:Mn_2O_3:Al_2O_3 =$ $0.05:(0.475 \times 1.047):0.15:0.2:0.2:0.025$ |
| E29 | $Na_{0.9}5Cu0.2Fe_{0.4}Mn_{0.4}O_{1.975}F_{0.05}$ | $Na_2CO_3:CuO:Fe_2O_3:Mn_2O_3:NaF =$ $(0.475 \times 1.047):0.2:0.2:0.2:0.05$ |
| D1 | $Na_{0.7}Cu_{0.1}Fe_{0.45}Mn_{0.45}O_2$ | $Na_2CO_3:CuO:Fe_2O_3:MnCO_3 =$ $0.35:0.1:0.225:0.45$ |
| D2 | $Na_{0.7}Cu_{0.1}Fe_{0.45}Mn_{0.45}O_2$ | $Na_2CO_3:CuO:Fe_2O_3:MnCO_3 =$ $(0.35 \times 1.2):0.1:0.225:0.45$ |
| D3 | $Na_{0.9}Cu_{0.3}Fe_{0.3}Mn_{0.3}Ti_{0.1}O_2$ | $Na_2CO_3:CuO:Fe_2O_3:Mn_2O_3:TiO_2 =$ $0.45:0.3:0.15:0.15:0.1$ |
| D4 | $Na_{0.9}Cu_{0.3}Fe_{0.3}Mn_{0.3}Ti_{0.1}O_2$ | $Na_2CO_3:CuO:Fe_2O_3:Mn_2O_3:TiO_2 =$ $(0.45 \times 1.2):0.3:0.15:0.15:0.1$ |
| D5 | $NaCu_{0.1}Fe_{0.35}Mn_{0.45}Mg_{0.1}O_2$ | $Na_2CO_3:CuO:Fe_2O_3:Mn_2O_3:MgO =$ $0.5:0.1:0.175:0.225:0.1$ |
| D6 | $NaCu_{0.1}Fe_{0.35}Mn_{0.45}Mg_{0.1}O_2$ | $Na_2CO_3:CuO:Fe_2O_3:Mn_2O_3:MgO =$ $(0.5 \times 1.2):0.1:0.175:0.225:0.1$ |
| D7 | $Li_{0.05}Na_{0.9}5Cu0.2Fe_{0.3}Mn_{0.4}Ni_{0.1}O_2$ | $Li_2CO_3:Na_2CO_3:CuO:Fe_2O_3:Mn_2O_3:NiO =$ $0.025:0.475:0.2:0.15:0.2:0.1$ |
| D8 | $Li_{0.05}Na_{0.9}5Cu0.2Fe_{0.3}Mn_{0.4}Ni_{0.1}O_2$ | $Li_2CO_3:Na_2CO_3:CuO:Fe_2O_3:Mn_2O_3:NiO =$ $(0.025 \times 1.2):(0.475 \times 1.2):0.2:0.15:0.2:0.1$ |
| D9 | $Mg_{0.05}Na_{0.9}5Cu_{0.15}Fe_{0.4}Mn_{0.4}Al_{0.05}O_2$ | $MgO:Na_2CO_3:CuO:Fe_2O_3:Mn_2O_3:Al_2O_3 =$ $0.05:0.475:0.15:0.2:0.2:0.025$ |
| D10 | $Mg_{0.05}Na_{0.9}5Cu_{0.15}Fe_{0.4}Mn_{0.4}Al_{0.05}O_2$ | $MgO:Na_2CO_3:CuO:Fe_2O_3:Mn_2O_3:Al_2O_3 =$ $0.05:(0.475 \times 1.2):0.15:0.2:0.2:0.025$ |
| D11 | $Na_{0.9}5Cu0.2Fe_{0.4}Mn_{0.4}O_{1.975}F_{0.05}$ | $Na_2CO_3:CuO:Fe_2O_3:Mn_2O_3:NaF =$ $0.475:0.2:0.2:0.2:0.05$ |
| D12 | $Na_{0.9}5Cu0.2Fe_{0.4}Mn_{0.4}O_{1.975}F_{0.05}$ | $Na_2CO_3:CuO:Fe_2O_3:Mn_2O_3:NaF =$ $(0.475 \times 1.2):0.2:0.2:0.2:0.05$ |

TABLE 2

Test data of positive electrode active materials

| | pH | $d_{003}$ Å | $D_v50$ μm | $D_v99$ μm | Specific surface area $m^2/g$ | Tapped density $g/cm^3$ | Compacted density $g/cm^3$ | First cycle charge specific capacity mAh/g | First cycle Coulomb efficiency % |
|---|---|---|---|---|---|---|---|---|---|
| E1 | 10.5 | 5.48 | 8 | 45 | 1 | 2 | 3.8 | 87 | 87 |
| E2 | 11.0 | 5.48 | 8 | 45 | 1 | 2 | 3.8 | 93 | 88 |
| E3 | 11.5 | 5.48 | 8 | 45 | 1 | 2 | 3.8 | 95 | 91 |
| E4 | 12.0 | 5.48 | 8 | 45 | 1 | 2 | 3.8 | 99 | 93 |
| E5 | 12.5 | 5.48 | 8 | 45 | 1 | 2 | 3.8 | 100 | 95 |
| E6 | 13.0 | 5.48 | 8 | 45 | 1 | 2 | 3.8 | 97 | 92 |
| E7 | 12.2 | 5.00 | 8 | 45 | 1 | 2 | 3.8 | 89 | 77 |
| E8 | 12.2 | 5.20 | 8 | 45 | 1 | 2 | 3.8 | 90.8 | 87.4 |
| E9 | 12.2 | 5.30 | 8 | 45 | 1 | 2 | 3.8 | 91.7 | 88 |
| E10 | 12.2 | 5.40 | 8 | 45 | 1 | 2 | 3.8 | 93.4 | 88.6 |
| E11 | 12.2 | 5.45 | 8 | 45 | 1 | 2 | 3.8 | 98.8 | 90.7 |
| E12 | 12.2 | 5.50 | 8 | 45 | 1 | 2 | 3.8 | 101 | 96.5 |
| E13 | 12.2 | 5.60 | 8 | 45 | 1 | 2 | 3.8 | 97.7 | 93.8 |
| E14 | 12.2 | 5.70 | 8 | 45 | 1 | 2 | 3.8 | 91.7 | 89.7 |
| E15 | 12.2 | 5.80 | 8 | 45 | 1 | 2 | 3.8 | 86 | 77.8 |
| E16 | 12.2 | 5.49 | 1 | 38 | 1.8 | 2.2 | 3.97 | 100 | 79 |
| E17 | 12.2 | 5.49 | 2 | 45 | 1.5 | 2.35 | 3.97 | 100.6 | 89.4 |
| E18 | 12.2 | 5.49 | 5 | 42 | 0.89 | 2.3 | 3.97 | 101 | 91.8 |
| E19 | 12.2 | 5.49 | 8 | 40 | 0.95 | 2.33 | 3.97 | 102.8 | 93.2 |
| E20 | 12.2 | 5.49 | 10 | 36 | 1.04 | 2.31 | 3.97 | 104 | 94 |
| E21 | 12.2 | 5.49 | 15 | 33 | 0.94 | 2.32 | 3.97 | 102.4 | 92.4 |
| E22 | 12.2 | 5.49 | 18 | 32 | 0.91 | 2.28 | 3.97 | 100 | 91 |
| E23 | 12.2 | 5.49 | 25 | 29 | 0.87 | 1.96 | 3.97 | 98 | 91.6 |
| E24 | 12.2 | 5.49 | 27 | 48 | 0.78 | 1.92 | 3.87 | 95 | 80.7 |
| E25 | 12.34 | 5.48 | 8.7 | 42 | 0.94 | 1.9 | 4.1 | 103 | 94 |
| E26 | 12.34 | 5.48 | 8.7 | 42 | 0.94 | 1.9 | 4.1 | 104 | 93.8 |
| E27 | 12.34 | 5.48 | 8.7 | 42 | 0.94 | 1.9 | 4.1 | 105 | 92 |
| E28 | 12.34 | 5.48 | 8.7 | 42 | 0.94 | 1.9 | 4.1 | 103.9 | 91 |
| E29 | 12.34 | 5.48 | 8.7 | 42 | 0.94 | 1.9 | 4.1 | 104.7 | 92 |
| D1 | 10.0 | 5.65 | 12 | 50 | 0.83 | 1.83 | 3.64 | 75 | 86.4 |
| D2 | 13.5 | 5.65 | 12 | 50 | 0.83 | 1.83 | 3.64 | 78 | 85 |
| D3 | 10.0 | 5.475 | 6 | 37 | 1.2 | 2.1 | 4.2 | 92 | 84 |
| D4 | 13.5 | 5.475 | 6 | 37 | 1.2 | 2.1 | 4.2 | 91 | 83.9 |
| D5 | 10.0 | 5.45 | 14 | 52 | 0.8 | 1.86 | 3.78 | 95 | 84.5 |
| D6 | 13.5 | 5.45 | 14 | 52 | 0.8 | 1.86 | 3.78 | 93 | 83.2 |
| D7 | 10.0 | 5.46 | 12.8 | 48.7 | 0.88 | 1.92 | 3.83 | 96 | 78.7 |
| D8 | 13.5 | 5.46 | 12.8 | 48.7 | 0.88 | 1.92 | 3.83 | 96.9 | 84 |
| D9 | 10.0 | 5.472 | 10.4 | 37.8 | 1.07 | 1.98 | 3.97 | 94 | 83 |
| D10 | 13.5 | 5.472 | 10.4 | 37.8 | 1.07 | 1.98 | 3.97 | 96 | 81.7 |
| D11 | 10.0 | 5.489 | 13 | 54 | 0.84 | 1.93 | 3.89 | 97.6 | 82 |
| D12 | 13.5 | 5.489 | 13 | 54 | 0.84 | 1.93 | 3.89 | 98.5 | 83.5 |

What is claimed is:

1. A positive electrode active material satisfying the chemical formula $L_xNa_yM_zCu_\alpha Fe_\beta Mn_\gamma O_{2+\delta-0.5\eta}X_\eta$, wherein
   L is a doping element at alkali metal site and selected from one or more of $Li^+$, $K^+$, $Mg^{2+}$, $Ca^{2+}$ and $Zn^{2+}$;
   M is a doping element at transition metal site and selected from one or more of $Li^+$, $Ni^{2+}$, $Mg^{2+}$, $Mn^{2+}$, $Zn^{2+}$, $Co^{2+}$, $Ca^{2+}$, $Ba^{2+}$, $Sr^{2+}$, $Mn^{3+}$, $Al^{3+}$, $B^{3+}$, $Cr^{3+}$, $V^{3+}$, $Zr^{4+}$, $Ti^{4+}$, $Sn^{4+}$, $V^{4+}$, $Mo^{4+}$, $Mo^{5+}$, $Ru^{4+}$, $Nb^{5+}$, $Si^{4+}$, $Nb^{6+}$, $Mo^{6+}$ and $Te^{6+}$;
   X is a doping element at oxygen site and selected from one or more of $F^-$, $Cl^-$, $Br^-$ and $I^-$,
   $0 \leq x \leq 0.35$, $0.65 \leq y \leq 1$, $0 < \alpha \leq 0.3$, $0 < \beta < 0.5$, $0 < \gamma < 0.5$, $-0.03 < \delta < 0.03$, $0 \leq \eta \leq 0.1$, and $z+\alpha+\beta+\gamma=1$; and $mx+y+nz+2\alpha+3\beta+4\gamma=2(2+\delta)$, m is the valence state of L, and n is the valence state of M;
   the positive electrode active material has a pH value of from 10.5 to 13; and
   an interlayer spacing $d_{003}$ between two crystal planes (003) of the positive electrode active material is from 5.40 Å to 5.50 Å.

2. The positive electrode active material according to claim 1, wherein the positive electrode active material has a pH value of from 11.5 to 12.5.

3. The positive electrode active material according to claim 1, wherein the positive electrode active material has a space group of R3̄m.

4. The positive electrode active material according to claim 1, wherein the positive electrode active material has a mean particle size $D_v50$ of from 2 μm to 25 μm.

5. The positive electrode active material according to claim 1, wherein the positive electrode active material has a particle size $D_v99$ of from 15 μm to 80 μm.

6. The positive electrode active material according to claim 1, wherein the positive electrode active material has a mean particle size $D_v50$ of from 2 μm to 25 μm; and
   the positive electrode active material has a particle size $D_v99$ of from 15 μm to 80 μm.

7. The positive electrode active material according to claim 1, wherein the positive electrode active material has a specific surface area of from 0.5 $m^2/g$ to 7.0 $m^2/g$.

8. The positive electrode active material according to claim 1, wherein the positive electrode active material has a tapped density of from 1.5 $g/cm^3$ to 3.0 $g/cm^3$.

9. The positive electrode active material according to claim 1, wherein the positive electrode active material has a compacted density of from 3.0 g/cm³ to 5.0 g/cm³ at a pressure of 8 t.

10. The positive electrode active material according to claim 1, wherein the positive electrode active material has a mean particle size $D_v50$ of from 5 μm to 15 μm.

11. The positive electrode active material according to claim 1, wherein the positive electrode active material has a particle size $D_v99$ of from 20 μm to 60 μm.

12. The positive electrode active material according to claim 1, wherein the positive electrode active material has a mean particle size $D_v50$ of from 5 μm to 15 μm; and the positive electrode active material has a particle size $D_v99$ of from 20 μm to 60 μm.

13. The positive electrode active material according to claim 1, wherein the positive electrode active material has a specific surface area of from 0.8 m²/g to 3.0 m²/g.

14. The positive electrode active material according to claim 1, wherein the positive electrode active material has a tapped density of from 1.8 g/cm³ to 2.8 g/cm³.

15. The positive electrode active material according to claim 1, wherein the positive electrode active material has a compacted density of from 3.5 g/cm³ to 4.5 g/cm³ at a pressure of 8 t.

16. A method for preparing the positive electrode active material according to claim 1, comprising the following steps:

mixing a L source, Na source, M source, Cu source, Fe source, Mn source and X source in a preset proportion, and then conducting a thermal treatment in an oxygen-containing atmosphere to obtain a sodium transition metal oxide;

washing the sodium transition metal oxide with a washing solution, wherein the washing solution has a pH value of from 3 to 13;

re-washing the washed sodium transition metal oxide with deionized water; and drying the re-washed sodium transition metal oxide to obtain the positive electrode active material.

17. A sodium-ion battery, comprising the positive electrode active material according to claim 1.

18. An apparatus, comprising the sodium-ion battery according to claim 17.

\* \* \* \* \*